United States Patent Office 2,744,137
Patented May 1, 1956

2,744,137

PROCESS FOR THE MANUFACTURE OF N-METHYL-β-CYCLOHEXEN-(1)-YLETHYL-AMINE

Rudolf Grewe, Kiel, Germany, assignor to Hoffmann-La Roche Inc., Nutley, N. J., a corporation of New Jersey No Drawing. Application May 26, 1953,
Serial No. 357,617

Claims priority, application Germany May 29, 1952

6 Claims. (Cl. 260—563)

Up to now, N-methyl-β-cyclohexen-(1)-yl-ethyl-amine has been obtained by formylation of β-cyclohexen-(1)-yl-ethyl-amine and subsequent reduction of the N-formyl compound formed (O. Schnider and J. Hellerbach, Helvetica Chimica Acta, volume 34 [1951], page 2218).

The present invention now provides a novel process for the obtention of the said N-methyl-β-cyclohexen-(1)-yl-ethyl-amine, which process comprises reacting β-cyclohexen-(1)-yl-ethyl-amine in the presence of a condensing agent, such as for example zinc chloride, with a ketone of the general formula

wherein R stands for an aryl or lower alkyl radical, to form the corresponding Schiff base of the general formula

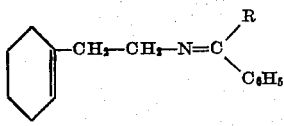

reacting the latter with a methylating agent and treating the condensaation product obtained with an alkaline agent.

A suitable mode of procedure consists in reacting β-cyclohexen-(1)-yl-ethyl-amine with benzophenone or a phenyl alkyl ketone in the presence of a suitable catalyst, such as zinc chloride or the complex salt of zinc chloride with β-cyclohexen-(1)-yl-ethylamine, the starting materials being refluxed in a suitable inert solvent, preferably xylene, while the water formed is separated off from the reaction mixture by means of a water separator. The Schiff base, which, in case benzophenone has been used as the ketone, has the constitution of N-benzhydrylidene-cyclohexen-(1)-yl-ethyl-amine, need not be isolated, but may be methylated directly at its nitrogen atom. This may be effected by heating the xylene solution in which the Schiff base has been formed after having separated the catalyst, with a suitable methylating agent, for example dimethyl sulfate. After having distilled off the solvent, the methylation product is heated with an alkaline agent, such as aqueous sodium or potassium hydroxide, to decompose into N-methyl-β-cyclohexen-(1)-yl-ethyl-amine and the ketone; the latter may be purified as usual, whereupon it may be used again.

Example

50.1 g. (0.4 mol) of β-cyclohexen-(1)-yl-ethyl-amine, 72.9 g. (0.4 mol) benzophenone and 4.0 g. of the complex salt of β-cyclohexen-(1)-yl-ethyl-amine with zinc chloride (melting point 192-194° C., prepared by reacting an aqueous solution of 0.03 mol of zinc chloride with 0.06 mol of β-cyclohexen-(1)-yl-ethyl-amine) are refluxed with 150 cc. of absolute xylene, the water formed during the reaction being continuously separated from the reaction mixture by means of a water separator. The catalyst is separated from the xylene solution, 60.5 g. (0.48 mol) of freshly distilled dimethyl sulfate are added to the latter and the mixture is heated for 1 hour on the steam bath. The xylene is distilled off in vacuo and the oily residue is cautiously heated for 30 minutes in a water bath with 80 cc. of 3N sodium hydroxide solution. The mixture is kept standing for 30 minutes, 3N hydrochloric acid is then added until the solution reacts acid to congo and the acid solution is extracted with ether. The aqueous layer is separated from the ether layer, which contains the whole amount of benzophenone used, and 3N sodium hydroxide solution is added to the aqueous layer while cooling with ice. The base which separates is taken up in ether, the ether solution is washed with water and dried over sodium sulfate. After having distilled off the ether, the N-methyl-β-cyclohexen-(1)-1-yl-ethyl-amine is obtained in the form of a yellow oil, which distills at 82° C. under a pressure of 12 mm. Hg. The pure base is colorless.

I claim:

1. A process which comprises reacting β-cyclohexen-(1)-yl-ethyl-amine in the presence of a condensing agent selected from the group consisting of zinc chloride and the complex salt of zinc chloride with β-cyclohexen-(1)-yl-ethyl-amine with a ketone of the general formula

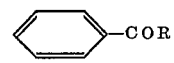

R being selected from the group consisting of the phenyl radical and lower alkyl radicals, to form the corresponding Schiff base, reacting the latter with a methyl ester of a strong inorganic acid and treating the condensation product formed with an alkali metal hydroxide so as to produce N-methyl-β-cyclohexen-(1)-yl-ethyl-amine.

2. The process of claim 1, wherein the methyl ester of a strong inorganic acid is dimethyl sulfate.

3. The process of claim 1, wherein the alkali metal hydroxide is a member of the group consisting of sodium hydroxide and potassium hydroxide.

4. A process which comprises heating in xylene β-cyclohexen-(1)-yl-ethyl-amine with benzophenone in the presence of the complex salt of zinc chloride with β-cyclohexen-(1)-yl-ethyl-amine, separating off the zinc chloride, heating the solution with dimethyl sulfate, decomposing the methylation product with sodium hydroxide solution, and isolating the N-methyl-β-cyclohexen-(1)-yl-ethyl-amine formed.

5. A compound represented by the general formula

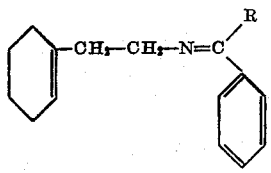

wherein R is selected from the group consisting of the phenyl radical and lower alkyl radicals.

6. N-benzhydrylidene-cyclohexen-(1)-yl-ethyl-amine.

No references cited.